United States Patent
Uemura et al.

(10) Patent No.: US 7,929,817 B2
(45) Date of Patent: Apr. 19, 2011

(54) OPTICAL MULTIPLEXER/DEMULTIPLEXER

(75) Inventors: Hiroshi Uemura, Yokohama (JP); Hideto Furuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/334,661

(22) Filed: Dec. 15, 2008

(65) Prior Publication Data

US 2009/0185803 A1 Jul. 23, 2009

(30) Foreign Application Priority Data

Jan. 18, 2008 (JP) .................................. 2008-009501

(51) Int. Cl.
*G02B 6/26* (2006.01)
*G02B 6/28* (2006.01)
(52) U.S. Cl. .......................................... 385/50; 385/24
(58) Field of Classification Search .................. None
See application file for complete search history.

(56) References Cited

U.S. PATENT DOCUMENTS

| 6,411,752 | B1 * | 6/2002 | Little et al. ...................... 385/17 |
| 6,643,421 | B1 * | 11/2003 | Chin et al. ...................... 385/15 |
| 6,859,603 | B2 * | 2/2005 | Hryniewicz et al. .......... 385/131 |
| 2004/0081386 | A1 | 4/2004 | Morse et al. | |
| 2004/0114807 | A1 | 6/2004 | Lelescu et al. | |

FOREIGN PATENT DOCUMENTS

JP 2006-504145 2/2006

* cited by examiner

*Primary Examiner* — Omar Rojas
(74) *Attorney, Agent, or Firm* — Oblon, Spivak, McClelland, Maier & Neustadt, L.L.P.

(57) ABSTRACT

An optical multiplexer/demultiplexer comprises one light guide main line which guides lights of a plurality of wavelengths, and two or more microring optical resonators directly optically coupled to the one light guide main line. The two or more microring optical resonators are arranged in any two of layers higher than, level with, and lower than a plane where the one light guide main line is disposed, and/or the two or more microring optical resonators are arranged on both sides of the one light guide main line in a light guide direction.

25 Claims, 6 Drawing Sheets

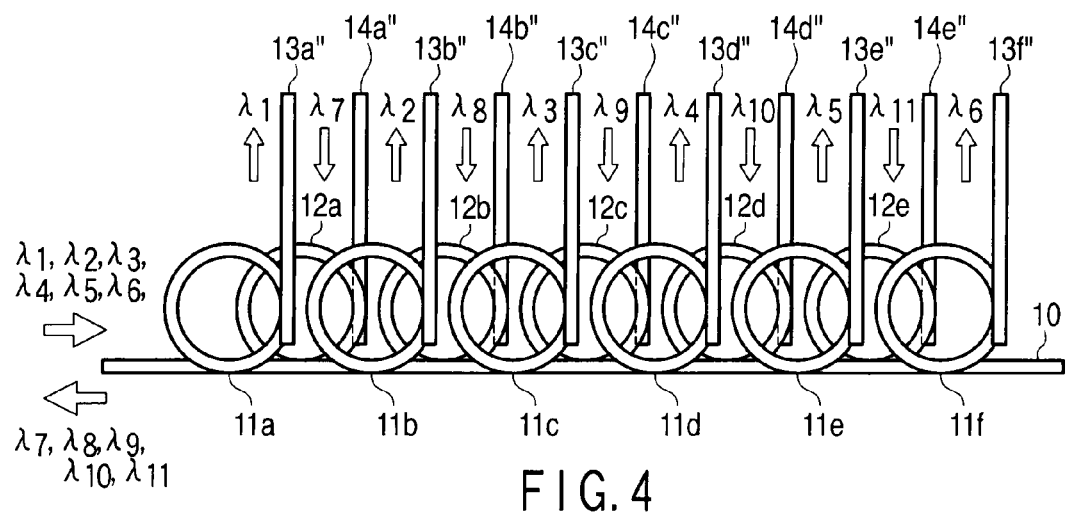
F I G. 4
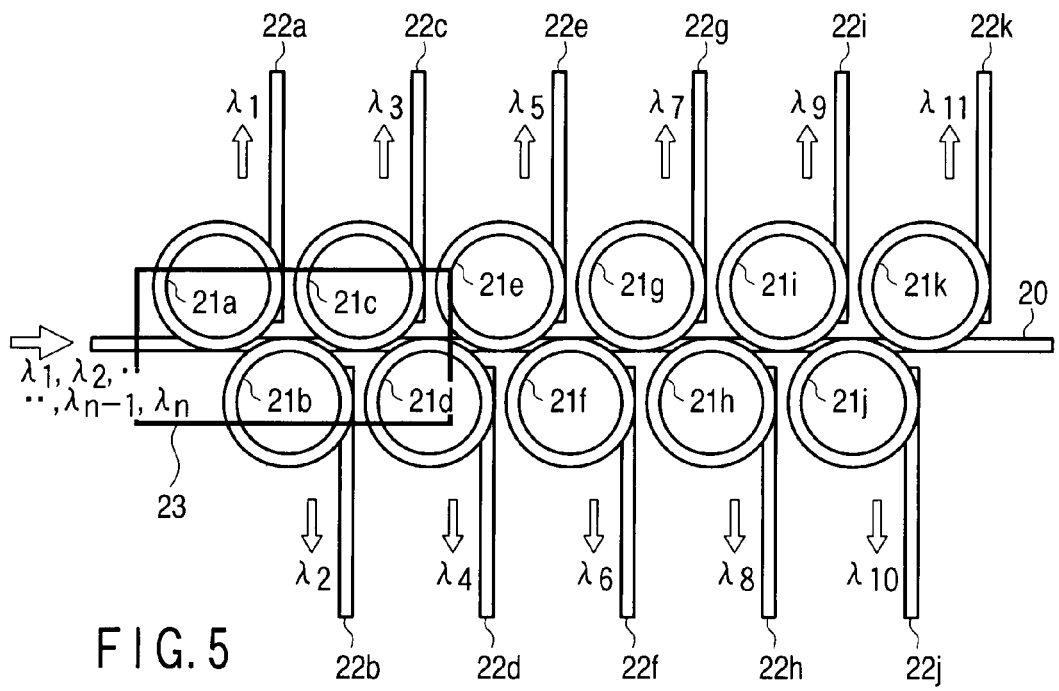
F I G. 5
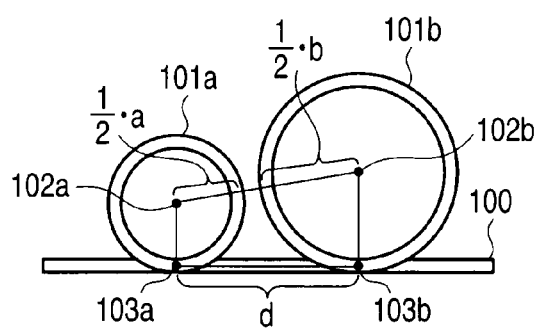
F I G. 6A
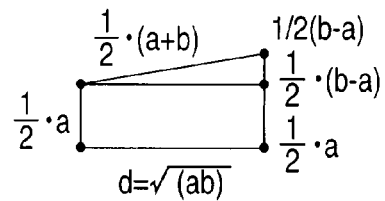
F I G. 6B

US 7,929,817 B2

OPTICAL MULTIPLEXER/DEMULTIPLEXER

CROSS-REFERENCE TO RELATED APPLICATIONS

This application is based upon and claims the benefit of priority from prior Japanese Patent Application No. 2008-009501, filed Jan. 18, 2008, the entire contents of which are incorporated herein by reference.

BACKGROUND OF THE INVENTION

There are enhanced opportunities for applying an optical signal having merits such as a high speed, less electromagnetic noise and low loss to the signal transmission in LSI. Under such circumstances, various optical devices have been devised with a view to being integrated in LSI. One such device raising great expectations is a microring optical resonator which selectively drops (splits) a light of a single wavelength or lights of a plurality of wavelengths to light guide branch lines from a light guide main line or selectively adds a light of a single wavelength or lights of a plurality of wavelengths to the light guide main line from the light guide branch lines (see, for example, JP2006-504145). This is because a microring optical resonator can be integrated in LSI as an optical signal multiplexer/demultiplexer and has advantages such as a small size and a high speed in wavelength multiplexing optical transmission which enables high-volume signal transmission.

However, the diameter of even a small ring of a microring optical resonator as described in JP2006-504145 is, for example, 10 micrometers (μm), which is much greater than the circuit size (e.g., 1 μm) in modern LSI. Therefore, it may be difficult to densely integrate a plurality of microring optical resonators in LSI.

BRIEF SUMMARY OF THE INVENTION

According to a first aspect of the present invention, there is provided an optical multiplexer/demultiplexer comprising: a light guide main line which guides lights of a plurality of wavelengths; and a plurality of microring optical resonators directly optically coupled to the light guide main line, wherein the plurality of microring optical resonators are arranged in two of layers higher than, level with, and lower than a plane where the light guide main line is disposed.

According to a second aspect of the present invention, there is provided an optical multiplexer/demultiplexer comprising: a light guide main line which guides lights of a plurality of wavelengths; and a plurality of microring optical resonators directly optically coupled to the one light guide main line, wherein the microring optical resonators are arranged on both sides of the light guide main line.

BRIEF DESCRIPTION OF THE DRAWING

FIG. 4 is a plan view showing an example in which a multiplexer/demultiplexer is composed;
FIG. 5 is a plan view showing an example of the configuration of an optical multiplexer/demultiplexer (demultiplexer) according to a third embodiment;
FIGS. 6A and 6B are views shown to explain the basic concept of the demultiplexer shown in FIG. 5.

DETAILED DESCRIPTION OF THE INVENTION

Embodiments of the present invention will be described with reference to the accompanying drawings. It should be noted that the drawings are schematic ones and the dimension ratios shown therein are different from the actual ones. The dimensions vary from drawing to drawing and so do the ratios of dimensions. The following embodiments are directed to a device and a method for embodying the technical concept of the present invention and the technical concept does not specify the material, shape, structure or configuration of components of the present invention.

First Embodiment

Before describing a first embodiment of the present invention in detail, the concept of the present embodiment is briefly described first.

Figure 2:
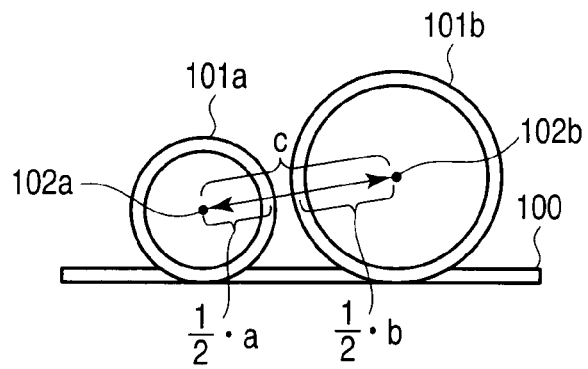
FIG. 2 is a view shown to explain the basic concept of the demultiplexer shown in FIG. 1.

In FIG. 2, 100 denotes a light guide main line for guiding lights of a plurality of wavelengths. 101a, 101b denote microring optical resonators optically coupled to the light guide main line 100, respectively. The microring optical resonators 101a, 101b are provided in a layer higher than a plane where the light guide main line 100 is disposed, and provided in the same layer (the level arrangement plane). 102a, 102b denote the central points of the microring optical resonators 101a, 101b, respectively. Further, in the drawing, ½·a is ½ of the outside diameter (ring diameter) "a" of a ring guide of the microring optical resonator 101a, ½·b is ½ of the outside diameter (ring diameter) "b" of a ring guide of the microring optical resonator 101b, and "c" is the distance (intercentral distance) between the central points 102a, 102b of the microring optical resonators 101a, 101b.

As shown in FIG. 2, the ring guides of the two microring optical resonators 101a, 101b are in contact with each other when the distance "c" between the centers of the microring optical resonators 101a, 101b is equal to or less than the sum of ½ of the outside diameters of the ring guides of the microring optical resonators 101a, 101b (i.e., c≦½(a+b)). At this point, the light of the wavelength guided in one (or the other) of the microring optical resonators 101a, 101b leaks into the other (or one) of the microring optical resonators 101a, 101b and that the characteristics of the microring optical resonators 101a, 101b deteriorate in terms of wavelength selectivity and output light strength.

Thus, in the first embodiment of the invention, two or more microring optical resonators directly optically coupled to the light guide main line are arranged in any two of layers higher than, level with, and lower than the plane where the light guide main line is disposed. This makes it possible to arrange, for example, two microring optical resonators so that the distance "c" between the centers of these microring optical resonators may satisfy $c \leq \frac{1}{2}(a+b)$ in the same horizontal projection plane parallel to the planes where the two microring optical resonators are arranged. That is, a plurality of microring optical resonators can be densely integrated in LSI without deteriorating their characteristics.

Figure 1:
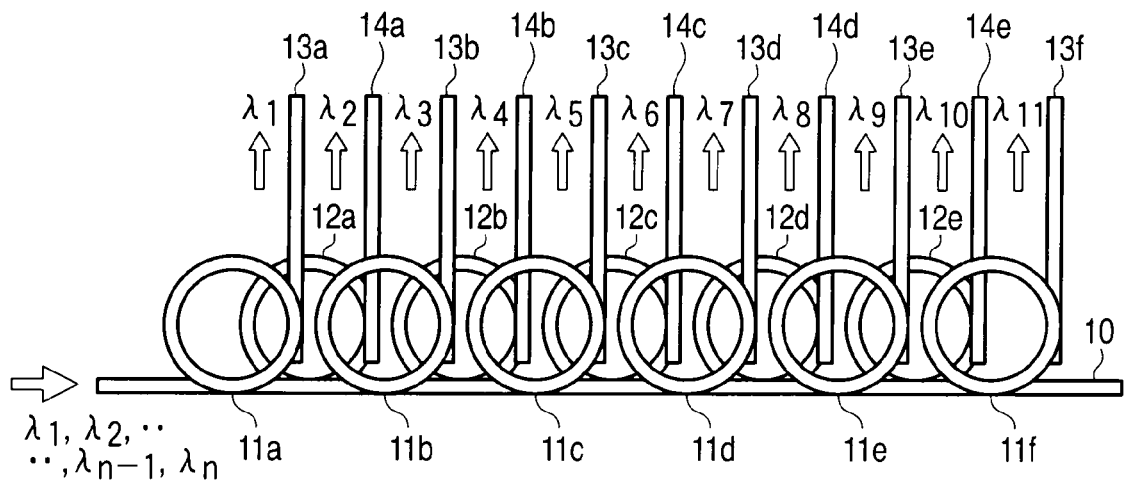
FIG. 1 is a plan view showing an example of the configuration of an optical multiplexer/demultiplexer (demultiplexer) according to a first embodiment.

FIG. 1 shows an example of the configuration of an optical multiplexer/demultiplexer for performing wavelength multiplexing optical transmission in LSI, according to the first embodiment. In the example described in the present embodiment, the optical multiplexer/demultiplexer is used as a demultiplexer which selectively drops a light (guided light) of a single wavelength or lights of a plurality of wavelengths to light guide branch lines from a light guide main line.

In FIG. 1, 10 denotes a light guide main line for guiding lights of a plurality of wavelengths ($\lambda 1, \lambda 2, \ldots, \lambda n-1, \lambda n$). 11a to 11f denote microring optical resonators arranged in a layer higher than a plane where the light guide main line 10 is disposed. 12a to 12e denote microring optical resonators arranged in a layer lower than the plane where the light guide main line 10 is disposed. The microring optical resonators 11a to 11f, 12a to 12e are only arranged on one side of the light guide main line 10 in a light guide direction. 13a to 13f denote light guide branch lines of the microring optical resonators 11a to 11f, respectively, and 14a to 14e denote light guide branch lines of the microring optical resonators 12a to 12e, respectively. The light guide branch lines 13a to 13f, 14a to 14e are provided in the layer level with the plane where the light guide main line 10 is disposed. The light guide branch lines 13a to 13f, 14a to 14e are only drawn on one side of the light guide main line 10 in the light guide direction.

Each of the microring optical resonators 11a to 11f, 12a to 12e has a different ring diameter (outside diameter of a ring guide) for each resonant wavelength, and these microring optical resonators are arranged in descending order of ring diameter, for example, in the light guide (shown arrow) direction of the light guide main line 10 (11a>12a>11b>12b>11c>12c>11d>12d>11e>12e>11f). Alternatively, the microring optical resonators may be arranged in ascending order of ring diameter in the light guide direction of the light guide main line 10 (11a<12a<11b<12b<11c<12c<11d<12d<11e<12e<11f).

Furthermore, the microring optical resonators 11a to 11f, 12a to 12e are arranged so that, for example, each of the distance between the centers of the microring optical resonator 11a and the microring optical resonators 12a, the distance between the centers of the microring optical resonator 12a and the microring optical resonators 11b, the distance between the centers of the microring optical resonator 11b and the microring optical resonators 12b, the distance between the centers of the microring optical resonator 12b and the microring optical resonators 11c, the distance between the centers of the microring optical resonator 11c and the microring optical resonators 12c, the distance between the centers of the microring optical resonator 12c and the microring optical resonators 11d, the distance between the centers of the microring optical resonator 11d and the microring optical resonators 12d, the distance between the centers of the microring optical resonator 12d and the microring optical resonators 11e, the distance between the centers of the microring optical resonator 11e and the microring optical resonators 12e, and the distance between the centers of the microring optical resonator 12e and the microring optical resonators 11f may be less than the sum of ½ of the outside diameters of their ring guides.

In addition, the microring optical resonators 11a to 11f, 12a to 12e are alternately arranged in the layers higher and lower than the plane where the light guide main line 10 is disposed. Moreover, the microring optical resonators 11a to 11f, 12a to 12e are arranged in an overlapping manner so that each of these microring optical resonators may be optically coupled to the light guide main line 10, and arranged in an overlapping manner so that these microring optical resonators may also be optically coupled to the corresponding light guide branch lines 13a to 13f, 14a to 14e.

In such a configuration, of the lights of a plurality of wavelengths ($\lambda 1, \lambda 2, \ldots, \lambda n-1, \lambda n$) guided in the light guide main line 10, the lights of the wavelengths coincident with the resonant wavelengths of the microring optical resonators 11a to 11f, 12a to 12e are only dropped in the corresponding light guide branch lines 13a to 13f, 14a to 14e. In the case of the present embodiment, the light of the wavelength $\lambda 1$ is dropped in the light guide branch line 13a by the microring optical resonator 11a. The light of the wavelength $\lambda 2$ is dropped in the light guide branch line 14a by the microring optical resonator 12a. The light of the wavelength $\lambda 3$ is dropped in the light guide branch line 13b by the microring optical resonator 11b. The light of the wavelength $\lambda 4$ is dropped in the light guide branch line 14b by the microring optical resonator 12b. The light of the wavelength $\lambda 5$ is dropped in the light guide branch line 13c by the microring optical resonator 11c. The light of the wavelength $\lambda 6$ is dropped in the light guide branch line 14c by the microring optical resonator 12c. The light of the wavelength $\lambda 7$ is dropped in the light guide branch line 13d by the microring optical resonator 11d. The light of the wavelength $\lambda 8$ is dropped in the light guide branch line 14d by the microring optical resonator 12d. The light of the wavelength $\lambda 9$ is dropped in the light guide branch line 13e by the microring optical resonator 11e. The light of the wavelength $\lambda 10$ is dropped in the light guide branch line 14e by the microring optical resonator 12e. The light of the wavelength $\lambda 11$ is dropped in the light guide branch line 13f by the microring optical resonator 11f. As a result, the lights of the single wavelengths $\lambda 1$ to $\lambda 11$ are only guided in each of the light guide branch lines 13a to 13f, 14a to 14e.

According to this embodiment, the microring optical resonators 11a to 11f, 12a to 12e are arranged to be stacked in the layers higher and lower than the plane where the light guide main line 10 is disposed, such that the integration density of the microring optical resonators 11a to 11f, 12a to 12e can be increased to about two times or more as compared with the case where the microring optical resonators are only arranged in the same layer (single layer). This may contribute to increased performance of LSI when the optical multiplexer/demultiplexer is integrated in LSI; for example, the microring optical resonators can be densely arranged, and optical interconnection can be effectively applied to LSI.

Second Embodiment

Figure 3:
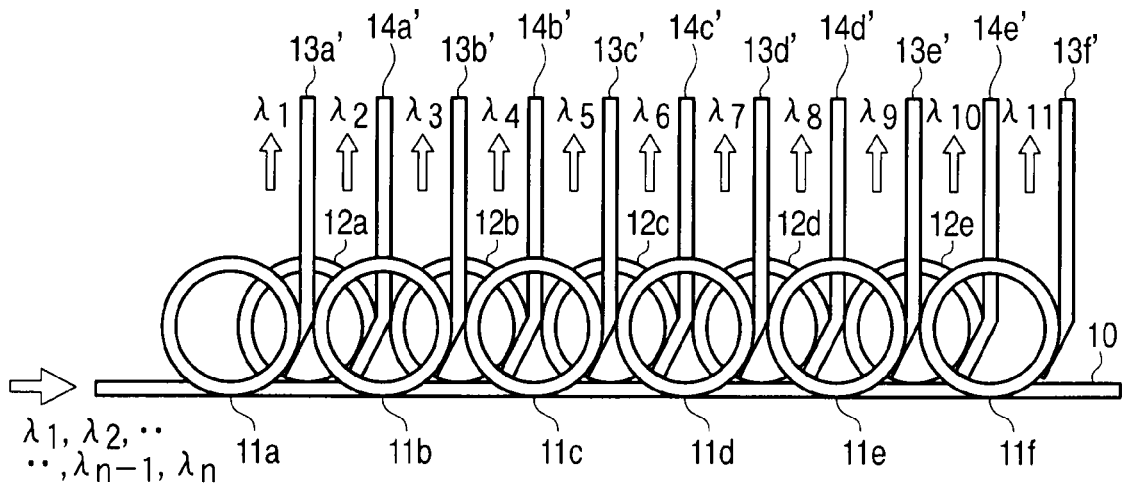
FIG. 3 is a plan view showing an example of the configuration of an optical multiplexer/demultiplexer (demultiplexer) according to a second embodiment.

FIG. 3 shows an example of the configuration of an optical multiplexer/demultiplexer for performing wavelength multiplexing optical transmission in LSI, according to a second embodiment. In the example described in the present embodiment, the optical multiplexer/demultiplexer is used as a demultiplexer which selectively drops a light (guided light) of a single wavelength or lights of a plurality of wavelengths to light guide branch lines from a light guide main line. It is to be noted that the same numerals are assigned to the same parts as those in the optical multiplexer/demultiplexer (demultiplexer) shown in FIG. 1 and a detailed description is omitted.

In the optical multiplexer/demultiplexer shown in the first embodiment (see FIG. 1), it is desirable that the light guide branch lines 13a to 13f, 14a to 14e optically coupled to the light guide main line 10 via the microring optical resonators 11a to 11f, 12a to 12e be arranged to perpendicularly intersect the tangential directions of other microring optical resonators that are not directly optically coupled. That is, the light guide branch lines 13a to 13f, 14a to 14e are arranged so that the light guide directions of the light guide branch lines 13a to 13f, 14a to 14e may perpendicularly intersect the light guide directions (tangential directions of the microring optical resonators) of other microring optical resonators that are not directly optically coupled to the light guide branch lines 13a to 13f, 14a to 14e in a horizontal projection plane. This makes it possible to minimize the interference between the light guide branch lines 13a to 13f, 14a to 14e and the other microring optical resonators that are not directly optically coupled.

Thus, in the present embodiment, light guide branch lines 13a' to 13e' (13f'), 14a' to 14e' are first drawn as straight portions in a direction nonperpendicular (nonorthogonal) to a light guide main line 10, and then further drawn as straight portions in a perpendicular (orthogonal) direction, for example, as shown in FIG. 3. As a result, the light guide branch lines 13a' to 13e' (13f'), 14a' to 14e' can be arranged to substantially perpendicularly intersect the light guide directions of microring optical resonators 11a to 11f, 12a to 12e that are not optically coupled.

Specifically, in the demultiplexer with the configuration shown in FIG. 3, the light guide branch line 13a' optically coupled to the microring optical resonator 11a is arranged to substantially perpendicularly intersect the ring guide of the microring optical resonator 12a that is not directly optically coupled. The light guide branch line 14a' is arranged to substantially perpendicularly intersect the ring guide of the microring optical resonator 11b that is not directly optically coupled. The light guide branch line 13b' is arranged to substantially perpendicularly intersect the ring guide of the microring optical resonator 12b that is not directly optically coupled. The light guide branch line 14b' is arranged to substantially perpendicularly intersect the ring guide of the microring optical resonator 11c that is not directly optically coupled. The light guide branch line 13c' is arranged to substantially perpendicularly intersect the ring guide of the microring optical resonator 12c that is not directly optically coupled. The light guide branch line 14c' is arranged to substantially perpendicularly intersect the ring guide of the microring optical resonator 11d that is not directly optically coupled. The light guide branch line 13d' is arranged to substantially perpendicularly intersect the ring guide of the microring optical resonator 12d that is not directly optically coupled. The light guide branch line 14d' is arranged to substantially perpendicularly intersect the ring guide of the microring optical resonator 11e that is not directly optically coupled. The light guide branch line 13e' is arranged to substantially perpendicularly intersect the ring guide of the microring optical resonator 12e that is not directly optically coupled. The light guide branch line 14e' is arranged to substantially perpendicularly intersect the ring guide of the microring optical resonator 11f that is not directly optically coupled.

According to this embodiment, the light guide branch lines 13a' to 13e' (13f'), 14a' to 14e' can be arranged to substantially perpendicularly intersect the ring guides of the microring optical resonators 11a to 11f, 12a to 12e that are not optically coupled, such that optical loss due to unnecessary optical coupling can be reduced.

In addition, although the microring optical resonators 11a to 11f, 12a to 12e are arranged in the layers higher and lower than the plane where the light guide main line 10 is disposed in both of the examples described in the first and second embodiments, the configuration is not limited to these structure. For example, the microring optical resonators 11a to 11f, 12a to 12e may be arranged in at least two layers level with and higher than or level with and lower than the plane where the light guide main line 10 is disposed. Alternatively, the microring optical resonators 11a to 11f, 12a to 12e may be arranged in three higher, level and lower layers.

Furthermore, the straight portions of the light guide branch lines 13a' to 13e' (13f'), 14a' to 14e' can be first drawn in the direction nonperpendicular (nonorthogonal) to the light guide main line 10, and their other straight portions can then be drawn in the perpendicular (orthogonal) direction through curved portions. In this case as well, the light guide branch lines 13a' to 13e' (13f'), 14a' to 14e' can be arranged to substantially perpendicularly intersect the ring guides of the microring optical resonators 11a to 11f, 12a to 12e that are not directly optically coupled.

Still further, in both of the light guide main line 10 and the light guide branch lines 13a to 13f, 14a to 14e, 13a' to 13f', 14a' to 14e', the guide direction of the guided light is not limited to one direction. Moreover, the light guide main line 10 and the light guide branch lines 13a to 13f, 14a to 14e, 13a' to 13f', 14a' to 14e' can be structured to be in multiple layers (separate layers).

Further yet, lights of a plurality of wavelengths λ1 to λn may be configured to be guided to the light guide branch lines 13a to 13f, 14a to 14e, 13a' to 13f', 14a' to 14e'.

Another configuration example multiplexer/demultiplexer is further described with FIG. 4. It is to be noted that the same numerals are assigned to the same parts as those in the demultiplexer shown in FIG. 1 and a detailed description is omitted.

In FIG. 4, 10 denotes a light guide main line for guiding lights of a plurality of wavelengths (λ1, λ2, . . . , λ10, λ11). 11a to 11f denote microring optical resonators arranged in a layer higher than a plane where the light guide main line 10 is disposed. 12a to 12e denote microring optical resonators arranged in a layer lower than the plane where the light guide main line 10 is disposed. 13a" to 13f" denote light guide branch lines in which the lights of the respective wavelengths are selectively dropped from the light guide main line 10 by the microring optical resonators 11a to 11f. 14a" to 14e" denote light guide branch lines from which the lights of the respective wavelengths are selectively added to the light guide main line 10 by the microring optical resonators 12a to 12e. The light guide branch lines 13a" to 13f" are arranged in a layer higher than the microring optical resonators 11a to 11f, and the light guide branch lines 14a" to 14e" are arranged in a layer lower than the microring optical resonators 12a to 12e.

In the case of the present configuration, the lights of a plurality of wavelengths (λ1, λ2, λ3, λ4, λ5, λ6) guided in the light guide main line 10 enter from the left side of the light guide main line 10 as indicated by an arrow in FIG. 4, and the lights of the wavelengths coincident with the resonant wavelengths of the microring optical resonators 11a to 11f are only dropped in the corresponding light guide branch lines 13a" to 13f". On the other hand, the lights of the wavelengths (λ7, λ8, λ9, λ10, λ11) guided in the light guide branch lines 14a" to 14e" are added to the light guide main line 10 by the microring optical resonators 12a to 12e having coincident resonant wavelengths. Consequently, the lights of a plurality of wavelengths (λ7, λ8, λ9, λ10, λ11) are guided in the light guide main line 10, and finally exit to the left side of the light guide main line 10 as indicated by an arrow in FIG. 4.

In such a configuration, the light guide branch lines (light guide branch lines for dropping) 13a" to 13f", the light guide branch lines (light guide branch lines for adding) 14a" to 14e" and the light guide main line 10 are respectively arranged in separate layers at a distance of at least one layer where the microring optical resonators 11a to 11f, 12a to 12e are arranged. Thus, it is possible to freely cause the light guide branch lines for dropping 13a" to 13f" and the light guide branch lines for adding 14a" to 14e" to be brought closer to or intersect the light guide main line 10 without generating mutual interference of the guided lights between the light guide branch lines for dropping 13a" to 13f", the light guide branch lines for adding 14a" to 14e" and the light guide main line 10. This configuration provides great freedom in drawing the light guide branch lines 13a" to 13f", 14a" to 14e" and the light guide main line 10.

Furthermore, a light receiver for detecting the dropped guided lights (lights of wavelengths) or an optical device (optical device for adding) for selectively adding the guided lights to another light guide main line (or branch lines) from the light guide branch lines for dropping 13a" to 13f" is connected to the ends of the light guide branch lines for dropping 13a" to 13f" opposite to the ends connected to the light guide main line 10. Moreover, a light emitter for generating guided lights to be added or an optical device (optical device for dropping) for selectively dropping the guided lights to the light guide branch lines for adding 14a" to 14e" from another light guide main line (or branch lines) is connected to the ends of the light guide branch lines for adding 14a" to 14e" opposite to the ends connected to the light guide main line 10.

As described above, the light guide branch lines 13a" to 13f", 14a" to 14e" and the light guide main line 10 are arranged in separate layers, respectively, so that the light guide main line/light guide branch lines, light receivers/emitters and adding/dropping optical devices connected to the above light guides (10, 13a" to 13f", 14a" to 14e") can also be easily arranged in separate layers. Moreover, as described above, the light guide branch lines 13a" to 13f", 14a" to 14e" and the light guide main line 10 can be freely drawn without the interference of the guided light. As a result, the light guide main line/light guide branch lines, light receivers/emitters and adding/dropping optical devices connected to the light guides (10, 13a" to 13f", 14a" to 14e") can be easily arranged in a separate or collective manner. This can contribute to higher integration of these optical devices of various kinds and thus an LSI electronic circuit connected to these optical devices.

Third Embodiment

Before describing a third embodiment of the present invention in detail, the concept of the present embodiment is briefly described first.

Figure 7:
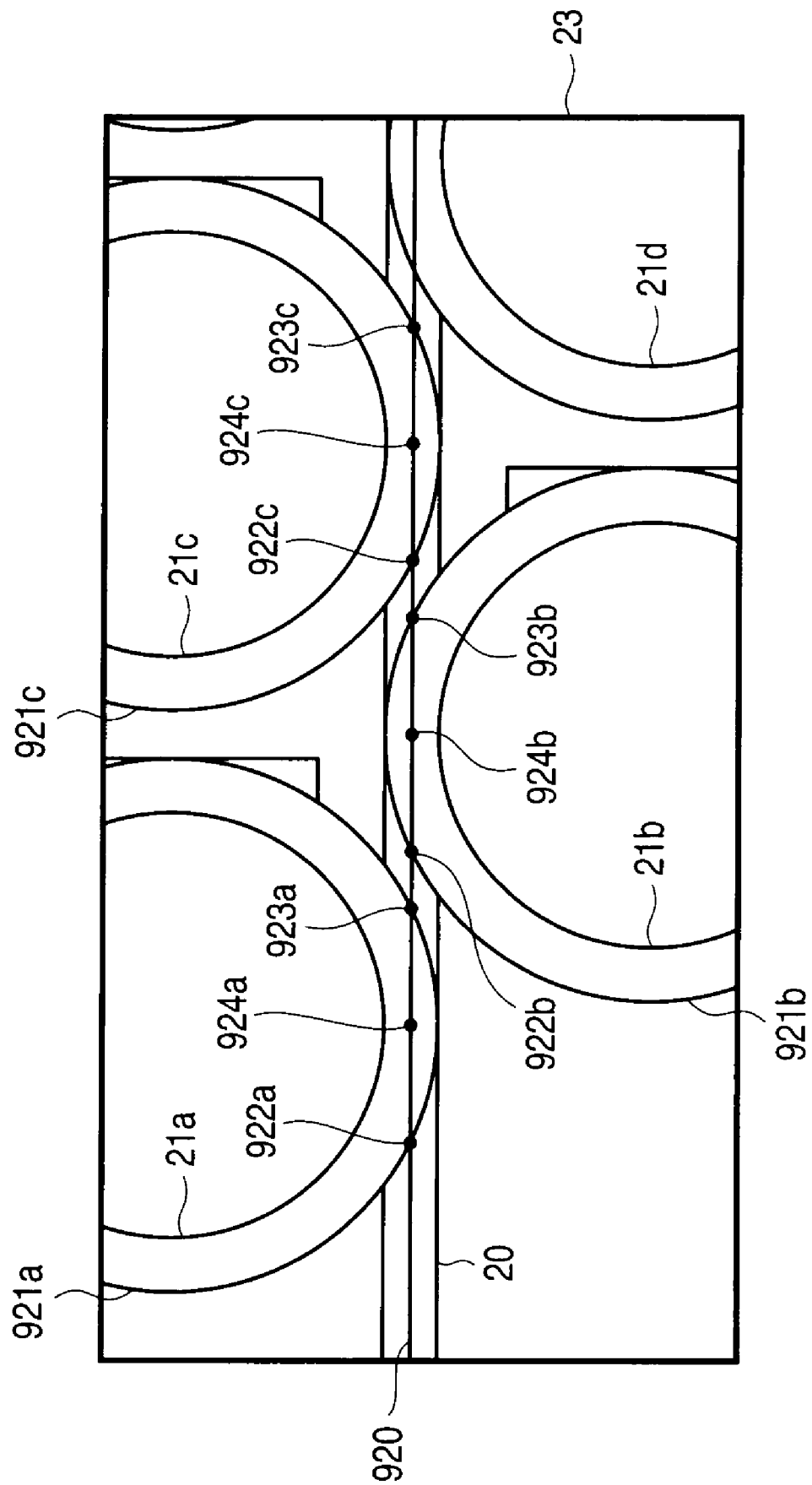
FIG. 7 is an enlarged view showing an extraction of part of the demultiplexer shown in FIG. 5.

In FIG. 6A, 100 denotes a light guide main line. 101a, 101b denote microring optical resonators optically coupled to the light guide main line 100, respectively. 102a, 102b denote the central points of the microring optical resonators 101a, 101b, respectively. 103a, 103b denote points on the central line of the light guide main line 100 which minimize the distance between the light guide main line 100 and the outer periphery of each of the microring optical resonators 101a, 101b (each microring optical resonator has two such points as shown in FIG. 7, so that a central point between these two points is 103a, 103b). Further, in the drawing, ½·a is ½ of the outside diameter (ring diameter) "a" of a ring guide of the microring optical resonator 101a, ½·b is ½ of the outside diameter "b" of a ring guide of the microring optical resonator 101b, and d is the distance between the points 103a, 103b on the central line of the light guide main line 100.

It is assumed here that when the outer peripheries of the microring optical resonators 101a, 101b are in contact with each other, the distance d has a length equal to, for example, one side of a trapezoid shown in FIG. 6B. That is, it is apparent that when the distance d satisfies $d \leq \sqrt{(ab)}$, the ring guides of the two microring optical resonators 101a, 101b are in contact with each other. At this point, the light of the wavelength guided in one (or the other) of the microring optical resonators 101a, 101b leaks into the other (or one) of the microring optical resonators 101a, 101b and the characteristics of the microring optical resonators 101a, 101b deteriorate in terms of wavelength selectivity and output light strength.

Thus, in the third embodiment, two or more microring optical resonators directly optically coupled to the light guide main line for guiding lights of a plurality of wavelengths are alternately arranged on both sides of the light guide main line in the light guide direction of the light guide main line in order of optical coupling. This makes it possible to arrange, for example, two microring optical resonators 101a, 101b so that the distance d between the points 103a, 103b on the central line of the light guide main line 100 which minimizes the distance between the light guide main line 100 and the outer periphery of each of the microring optical resonators 101a, 101b may satisfy $d \leq \sqrt{(ab)}$ in the same horizontal projection plane parallel to the plane where the two microring optical resonators are arranged. Thus, it is possible to take advantage of the above-mentioned effects.

FIG. 5 shows an example of the configuration of an optical multiplexer/demultiplexer for performing wavelength multiplexing optical transmission in LSI, according to a third embodiment of the present invention. In the example described in the present embodiment, the optical multiplexer/demultiplexer is used as a demultiplexer which selectively drops a light (guided light) of a single wavelength or lights of a plurality of wavelengths to light guide branch lines from a light guide main line.

In FIG. 5, 20 denotes a light guide main line for guiding lights of a plurality of wavelengths (λ1, λ2, . . . , λn−1, λn). 21a to 21k denote microring optical resonators alternately arranged on both sides of the light guide main line 20. 22a to 22k denote light guide branch lines of the microring optical resonators 21a to 21k. The microring optical resonators 21a to 21k are provided in layers higher than a plane where the light guide main line 20 is disposed, and the light guide branch lines 22a to 22k are provided in the layer level with the plane where the light guide main line 20 is disposed.

Each of the microring optical resonators 21a to 21k has a different ring diameter (outside diameter of a ring guide) for each resonant wavelength, and these microring optical resonators are arranged in descending (or ascending) order of ring diameter in the light guide (shown arrow) direction of the light guide main line 20. Further, the microring optical resonators 21a to 21k are alternately arranged on both sides of the light guide main line 20 to be sequentially optically coupled in the light guide direction. Still further, the microring optical resonators 21a to 21k are arranged so that a distance d between points on the central line of the light guide main line 20 which minimizes the distance between the light guide main line 20 and the outer periphery of each of (outside diameter "a") and the other (outside diameter "b") microring optical resonators may satisfy d≦√(ab) in the same horizontal projection plane parallel to the planes where the light guide main line 20 and the microring optical resonators 21a to 21k are arranged.

For example, in FIG. 7 showing a range 23 in FIG. 5 in an enlarged form, the microring optical resonators 21a, 21b are arranged so that the distance d between central points 924a, 924b of two points 922a, 923a and two points 922b, 923b on a central line 920 of the light guide main line 20 which minimizes the distance between the light guide main line 20 and an outer periphery 921a, 921b of each of the microring optical resonators 21a, 21b may satisfy d≦√(ab), where "a" is the outside diameter of the ring guide of the microring optical resonator 21a and "b" is the outside diameter of the ring guide of the microring optical resonator 21b. Likewise, the microring optical resonators 21b, 21c are arranged so that the distance d between central points 924b, 924c of two points 922b, 923b and two points 922c, 923c on the central line 920 of the light guide main line 20 which minimizes the distance between the light guide main line 20 and an outer periphery 921b, 921c of each of the microring optical resonators 21b, 21c may satisfy d≦√(ab), where "a" is the outside diameter of the ring guide of the microring optical resonator 21b and "b" is the outside diameter of the ring guide of the microring optical resonator 21c.

In addition, of the microring optical resonators 21a to 21k, the microring optical resonators 21a, 21c, 21e, 21g, 21i, 21k are arranged on one side of the light guide main line 20 in the light guide direction, while the microring optical resonators 21b, 21d, 21f, 21h, 21j are arranged on the other side of the light guide main line 20 in the light guide direction. Moreover, the microring optical resonators 21a to 21k are arranged in an overlapping manner to be optically coupled to the light guide main line 20 and also arranged in an overlapping manner to be optically coupled to the corresponding light guide branch lines 22a to 22k.

In such a configuration, of the lights of a plurality of wavelengths (λ1, λ2, . . . , λn−1, λn) guided in the light guide main line 20, the lights of the wavelengths coincident with the resonant wavelengths of the microring optical resonators 21a to 21k are only dropped in the corresponding light guide branch lines 22a to 22k. Thus, the lights of the single wavelengths λ1 to λ11 alone are guided to the light guide branch lines 22a to 22k.

According to this embodiment, the microring optical resonators 21a to 21k are alternately arranged in the same layer on both sides of the light guide main line 20 in the light guide direction of the light guide main line 20 in order of optical coupling, such that the integration density of the microring optical resonators 21a to 21k can be increased to about two times or more as compared with the case where the microring optical resonators are only arranged on one side of the light guide main line 20 in the light guide direction. This may contribute to increased performance of LSI when the optical multiplexer/demultiplexer is integrated in LSI; for example, the microring optical resonators can be densely arranged, and optical interconnection can be effectively applied to LSI.

Fourth Embodiment

Figure 8:
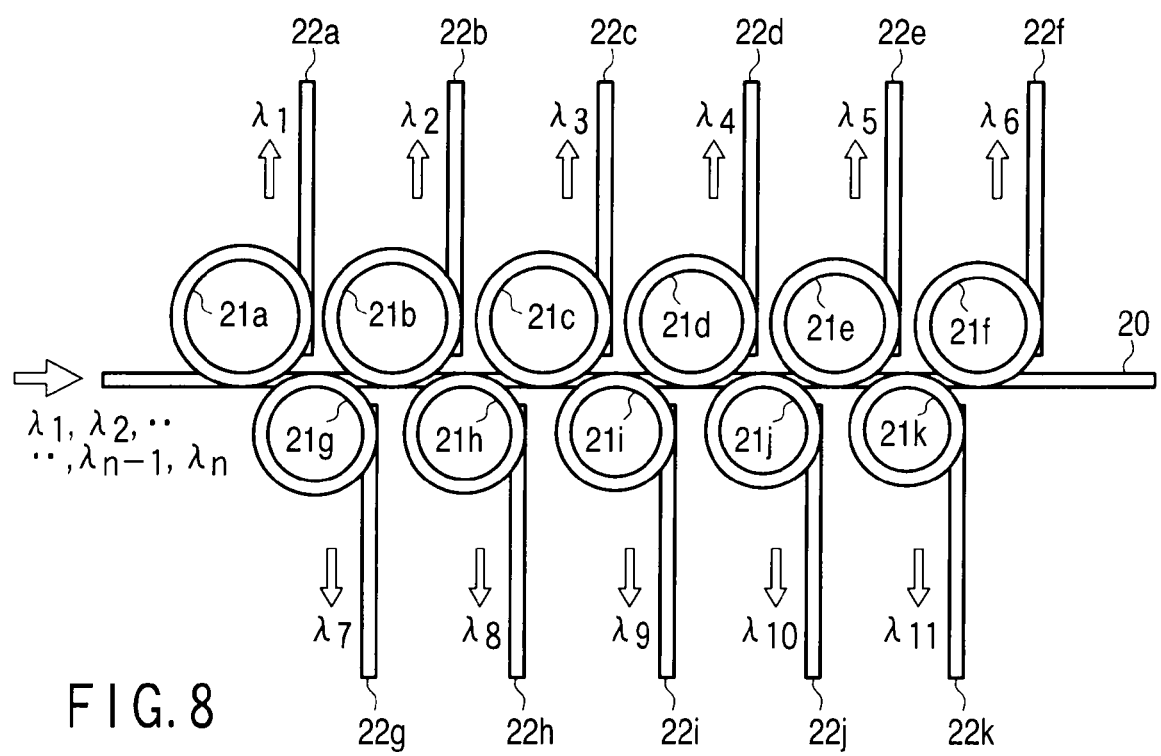
FIG. 8 is a plan view showing an example of the configuration of an optical multiplexer/demultiplexer (demultiplexer) according to a fourth embodiment.

FIG. 8 shows an example of the configuration of an optical multiplexer/demultiplexer for performing wavelength multiplexing optical transmission in LSI, according to a fourth embodiment of the present invention. In the example described in the present embodiment, the optical multiplexer/demultiplexer is used as a demultiplexer which selectively drops a light (guided light) of a single wavelength or lights of a plurality of wavelengths to light guide branch lines from a light guide main line. It is to be noted that the same numerals are assigned to the same parts as those in the optical multiplexer/demultiplexer (demultiplexer) shown in FIG. 5 and a detailed description is omitted.

In the optical multiplexer/demultiplexer shown in the third embodiment (see FIG. 5), it is desirable that the microring optical resonators 21a to 21k are arranged in descending (or ascending) order of ring diameter on both sides of the light guide main line 20 in the light guide direction.

Thus, in the present embodiment, microring optical resonators 21a to 21f are first arranged on one side of a light guide main line 20 in the light guide (shown arrow) direction in order of ring diameter, and then remaining microring optical resonators 21g to 21k are arranged on the other side of the light guide main line 20 in the light guide direction in order of ring diameter, for example, as shown in FIG. 8.

According to this embodiment, integration density can be further increased when the microring optical resonators 21a to 21k are arranged on both sides of the light guide main line 20 in the light guide direction of the light guide main line 20. This can contribute to increased performance and a reduction in the size of LSI when the optical multiplexer/demultiplexer is integrated in LSI.

In addition, in both of the examples shown in the above-described third and fourth embodiments, the light guide branch lines 22a to 22k are drawn onto both sides of the light guide main line 20 in accordance with the microring optical resonators 21a to 21k arranged on both sides of the light guide main line 20. This is not a restriction, and, for example, the light guide branch lines 22a to 22k may be configured to be only drawn toward one side of the light guide main line 20 in the light guide direction in such a manner as to intersect the light guide main line 20.

Furthermore, in both the light guide main line 20 and the light guide branch lines 22a to 22k, the guide direction of the guided light is not limited to one direction. Moreover, the light guide main line 20 and the light guide branch lines 22a to 22k can be structured to be in multiple layers (separate layers).

Further yet, lights of a plurality of wavelengths λ1 to λn may be configured to be guided to the light guide branch lines 22a to 22k.

Figure 9:
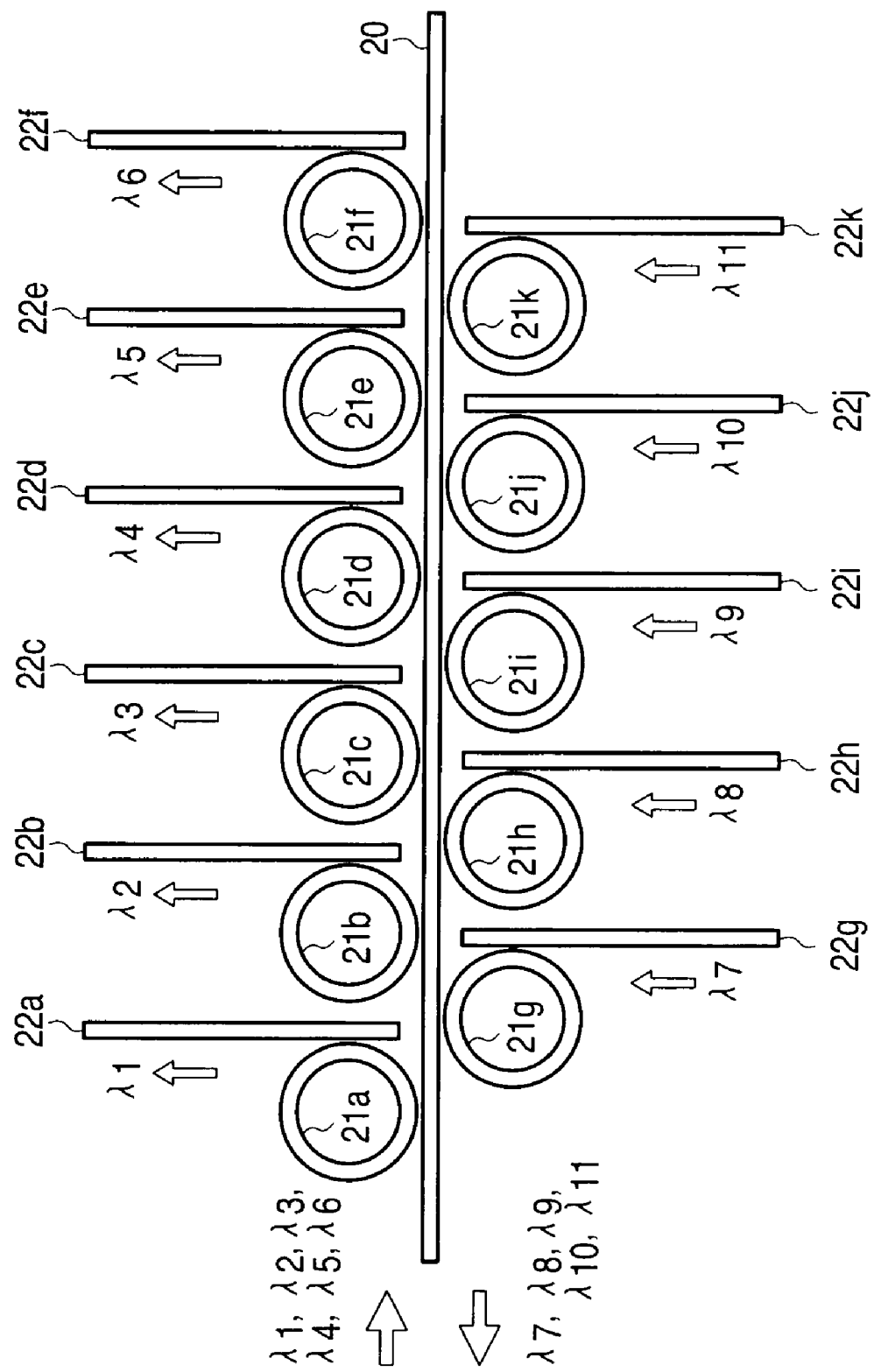
FIG. 9 is a plan view showing an example in which a multiplexer/demultiplexer is composed.

Another configuration example multiplexer/demultiplexer is further described with FIG. 9. It is to be noted that the same numerals are assigned to the same parts as those in the demultiplexer shown in FIG. 8 and a detailed description is omitted.

In FIG. 9, 20 denotes a light guide main line for guiding lights of a plurality of wavelengths (λ1, λ2, . . . , λ10, λ11). 21a to 21k denote microring optical resonators arranged in the layer level with a plane where the light guide main line 20 is disposed. The microring optical resonators 21a to 21k are alternately arranged on both sides of the light guide main line 20 along the light guide main line 20. 22a to 22k denote light guide branch lines provided in the layer level with the plane where the light guide main line 20 is disposed. The light guide branch lines 22a to 22f are drawn onto one side of the light guide main line 20, while the light guide branch lines 22g to 22k are drawn onto the other side of the light guide main line 20.

In the case of the present configuration, the lights of a plurality of wavelengths (λ1, λ2, . . . , λ5, λ6) guided in the light guide main line 20 enter from the left side of the light guide main line 20 as indicated by an arrow in FIG. 9, and the lights of the wavelengths coincident with the resonant wavelengths of the microring optical resonators 21a to 21f are only dropped in the corresponding light guide branch lines 22a to 22f. On the other hand, the lights of the wavelengths (λ7, λ8, λ9, λ10, λ11) guided in the light guide branch lines 22g to 22k are added to the light guide main line 20 by the microring optical resonators 21g to 21k having coincident resonant wavelengths. Consequently, the lights of a plurality of wavelengths (λ7, λ8, λ9, λ10, λ11) are guided in the light guide main line 20, and finally exit to the left side of the light guide main line 20 as indicated by an arrow in FIG. 9.

In such a configuration, the light guide branch lines (light guide branch lines for dropping) 22a to 22f and the light guide branch lines (light guide branch lines for adding) 22g to 22k can be separately arranged on the respective sides along the light guide main line 20. That is, the light guide branch lines for dropping 22a to 22f connected to the microring optical resonators 21a to 21f which drops the lights can only be on one side of the light guide main line 20, while the light guide branch lines for adding 22g to 22k connected to the microring optical resonators 21g to 21k which adds the lights can only be on the other side of the light guide main line 20. Thus, it is possible to prevent mutual interference of the guided lights from being generated by the crossing of the light guide branch lines 22a to 22k and the light guide main line 20 even when the light guide main line 20, the light guide branch lines 22a to 22k and the microring optical resonators 21a to 21k are all located in the same layer as shown in FIG. 9, which provides great freedom in drawing the light guide branch lines 22a to 22k and the light guide main line 20.

Furthermore, a light receiver for detecting the dropped guided lights or an optical device (optical device for adding) for selectively adding the guided lights to another light guide main line (or branch lines) from the light guide branch lines for dropping 22a to 22f is connected to the ends of the light guide branch lines for dropping 22a to 22f opposite to the ends connected to the light guide main line 20. Moreover, a light emitter for generating guided lights to be added or an optical device (optical device for dropping) for selectively dropping the guided lights to the light guide branch lines for adding 22g to 22k from another light guide main line (or branch lines) is connected to the ends of the light guide branch lines for dropping 22g to 22k opposite to the ends connected to the light guide main line 20.

As described above, the light guide branch lines 22a to 22f, 22g to 22k are separately arranged on the respective sides along the light guide main line 20, so that a light guide main line/branch lines, light receivers/emitters and adding/dropping optical devices connected to the above light guides (20, 22a to 22f, 22g to 22k) can be easily arranged on the respective sides along the light guide main line 20 in a separate or collective manner. This can contribute to higher integration of these optical devices of various kinds and thus an LSI electronic circuit connected to these optical devices.

Fifth Embodiment

Figure 10:
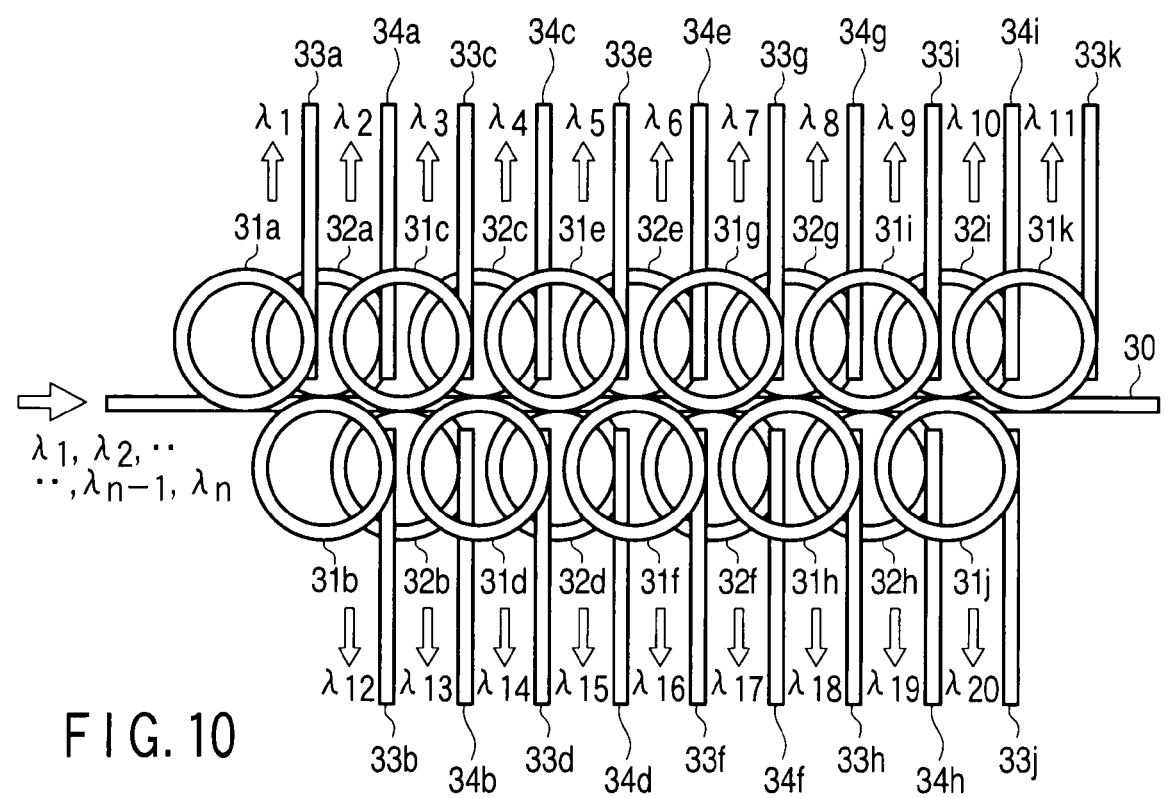
FIG. 10 is a plan view showing an example of the configuration of an optical multiplexer/demultiplexer (demultiplexer) according to a fifth embodiment.

FIG. 10 shows an example of the configuration of an optical multiplexer/demultiplexer for performing wavelength multiplexing optical transmission in LSI, according to a fifth embodiment of the present invention. In the example described in the present embodiment, the optical multiplexer/demultiplexer is used as a demultiplexer which selectively drops a light (guided light) of a single wavelength or lights of a plurality of wavelengths to light guide branch lines from a light guide main line.

In the example shown in the present embodiment, the above-described first and third embodiments are combined together, and the demultiplexer comprises two or more microring optical resonators directly optically coupled to a light guide main line for guiding lights of a plurality of wavelengths. That is, two or more microring optical resonators are arranged in a plurality of layers (any two of higher, level and lower layers) with respect to a plane where the light guide main line is disposed in such a manner as to satisfy $c \leq \frac{1}{2}(a+b)$ in the same horizontal projection plane parallel to the plane where the microring optical resonators are arranged, where "c" is the distance between the centers of the adjacent two microring optical resonators on both sides of the light guide main line in the light guide direction, "a" is the outside diameter of the ring guide of one microring optical resonator, and "b" is the outside diameter of the ring guide of the other microring optical resonator. Moreover, two or more microring optical resonators are alternately arranged on both sides of the light guide main line in the light guide direction in such a manner as to satisfy $d \leq \sqrt{(ab)}$, where "d" is the distance between points on the central line of the light guide main line which minimizes the distance between the outer periphery of each of the two microring optical resonators adjacent to each other across the light guide main line and the light guide main line in the plane where the two or more microring optical resonators are arranged, "a" is the outside diameter of the ring guide of one microring optical resonator, and "b" is the outside diameter of the ring guide of the other microring optical resonator.

For example, in FIG. 10, 30 denotes a light guide main line for guiding lights of a plurality of wavelengths (λ1, λ2, ..., λn−1, λn). 31a to 31k denote microring optical resonators which are arranged in a layer higher than a plane where the light guide main line 30 is disposed and which are alternately arranged on both sides of the light guide main line 30 in the light guide direction. 32a to 32i denote microring optical resonators which are arranged in a layer lower than the plane where the light guide main line 30 is disposed and which are alternately arranged on both sides of the light guide main line 30 in the light guide direction. 33a to 33k denote light guide branch lines of the microring optical resonators 31a to 31k, and 34a to 34i denote light guide branch lines of the microring optical resonators 32a to 32i. The light guide branch lines 33a to 33k, 34a to 34i are provided in the layer level with the plane where the light guide main line 30 is disposed.

In such a configuration, of the lights of a plurality of wavelengths (λ1, λ2, ..., λn−1, λn) guided in the light guide main line 30, the lights of the wavelengths coincident with the resonant wavelengths of the microring optical resonators 31a to 31k, 32a to 32i are only dropped in the corresponding light guide branch lines 33a to 33k, 34a to 34i. Thus, the lights of the single wavelengths λ1 to λ20 alone are guided to the light guide branch lines 33a to 33k, 34a to 34i.

As described above, the demultiplexer shown in the first embodiment and the demultiplexer shown in the third embodiment can be combined together, and when these demultiplexers are combined together, the integration density of the microring optical resonators 31a to 31k, 32a to 32i can be significantly improved, which can be a great contribution to increased performance of LSI.

In addition, in the configuration of the present embodiment as well, the light guide branch lines 33a to 33i (33j, 33k), 34a to 34i can be arranged to substantially perpendicularly intersect the ring guides of the microring optical resonators 31a to 31k, 32a to 32i that are not optically coupled, in order to reduce optical loss due to unnecessary optical coupling. That is, the present invention is not limited to the combination of the demultiplexer (optical multiplexer/demultiplexer) shown in the first embodiment and the demultiplexer (optical multiplexer/demultiplexer) shown in the third embodiment, and it is possible to combine, for example, the demultiplexer (optical multiplexer/demultiplexer) shown in the second embodiment and the demultiplexer (optical multiplexer/demultiplexer) shown in the third embodiment.

It is also possible to combine the demultiplexer (optical multiplexer/demultiplexer) shown in the first embodiment and the demultiplexer (optical multiplexer/demultiplexer) shown in the fourth embodiment, or to combine the demultiplexer (optical multiplexer/demultiplexer) shown in the second embodiment and the demultiplexer (optical multiplexer/demultiplexer) shown in the fourth embodiment.

Sixth Embodiment

Although the light guide main lines are only formed by the straight portions in the multiplexers/demultiplexers shown in all of the embodiments described above, the present invention is not limited thereto. For example, the light guide main line may be only formed by a curved portion or may be formed by a combination of a straight portion and a curved portion.

Figure 11:
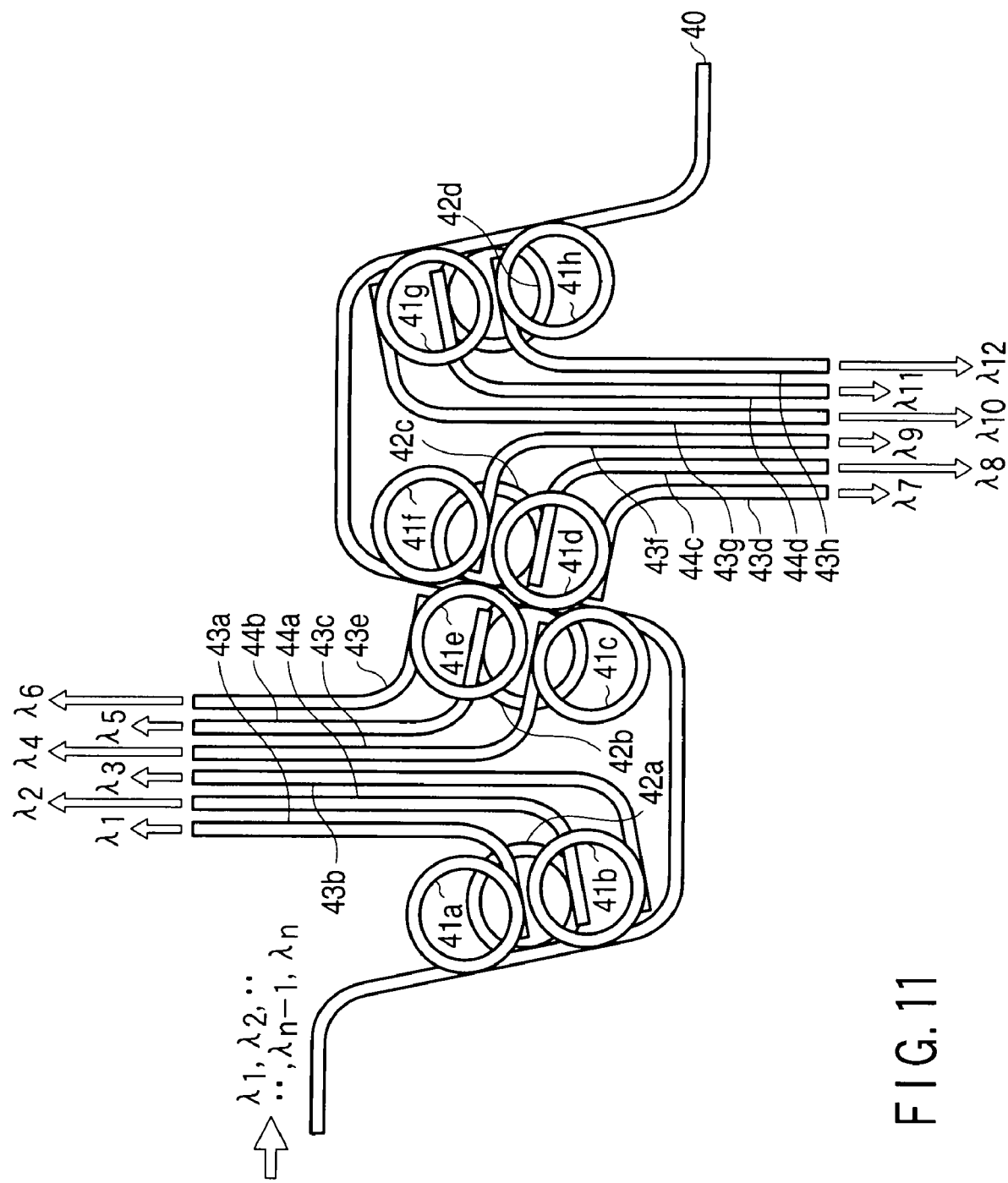
FIG. 11 is a plan view showing an example of the configuration of an optical multiplexer/demultiplexer (demultiplexer) according to a sixth embodiment.

FIG. 11 shows an example of the configuration of an optical multiplexer/demultiplexer for performing wavelength multiplexing optical transmission in LSI, according to a sixth embodiment of the present invention. In the example described in the present embodiment, the optical multiplexer/demultiplexer is used as a demultiplexer which selectively drops a light (guided light) of a single wavelength or lights of a plurality of wavelengths to light guide branch lines from a light guide main line.

In FIG. 11, 40 denotes a light guide main line for guiding lights of a plurality of wavelengths ($\lambda 1, \lambda 2, \ldots, \lambda n-1, \lambda n$), and the light guide main line has straight portions and curved portions. 41a to 41h denote microring optical resonators which are arranged in a layer higher than a plane where the light guide main line 40 is disposed and which are arranged on one side or both sides of the light guide main line 40. 42a to 42d denote microring optical resonators which are arranged in a layer lower than the plane where the light guide main line 40 is disposed and which are arranged on one side or both sides of the light guide main line 40. 43a to 43h denote light guide branch lines of the microring optical resonators 41a to 41k, and 44a to 44d denote light guide branch lines of the microring optical resonators 42a to 42d. The light guide branch lines 43a to 43h, 44a to 44d are provided in the layer level with the plane where the light guide main line 40 is disposed.

In such a configuration, of the lights of a plurality of wavelengths ($\lambda 1, \lambda 2, \ldots, \lambda n-1, \lambda n$) guided in the light guide main line 40, the lights of the wavelengths coincident with the resonant wavelengths of the microring optical resonators 41a to 41h, 42a to 42d are only dropped in the corresponding light guide branch lines 43a to 43h, 44a to 44d. Thus, the lights of the single wavelengths $\lambda 1$ to $\lambda 12$ alone are guided to the light guide branch lines 43a to 43h, 44a to 44d.

As described above, the light guide main line 40 is provided with the straight portions and the curved portions, such that not only can the microring optical resonators 41a to 41h, 42a to 42d be densely integrated, but also the light guide branch lines 43a to 43h, 44a to 44d can be more densely integrated, thereby enabling effective application of optical interconnection to LSI and thus allowing a great contribution to increased performance in LSI.

Other Embodiments

In other embodiments, the present invention is also applicable to, for example, data bus (on-chip data bus) communication in LSI using optical signals. That is, a combination of microring optical resonators exclusive to adding and dropping, or a microring optical resonator having both adding and dropping functions at the same time is used as an input/output port in a circuit block, and a large number of such input/output ports are prepared and optically coupled to a light guide main line, thereby enabling optical communication between a plurality of circuit blocks. In this case, a large number of microring optical resonators can be densely integrated, such that it is possible to configure an optical data bus enabling considerably high-volume data communication.

Moreover, the present invention is not limited to the multiplexer/demultiplexer of optical signals and is also applicable as a modulator having no light guide branch lines or a ring-type laser.

Particularly in the case of the microring optical resonators in the above-described embodiments and the modulator or the ring-type laser, their shapes do not have to be circular, and may be an oval or a combination of a straight shape and an arc shape.

Furthermore, the number of microring optical resonators is not limited to those in the embodiments either.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical multiplexer/demultiplexer comprising:
a light guide main line which guides lights of a plurality of wavelengths; and
a plurality of microring optical resonators directly optically coupled to the light guide main line,
wherein the plurality of microring optical resonators are arranged in two of layers higher than, level with, and lower than a plane where the light guide main line is disposed, and
the plurality of microring optical resonators are partially overlapped in a plan view,
wherein the microring optical resonators are arranged so that a distance "c" between the centers of adjacent microring optical resonators satisfies $c < \frac{1}{2}(a+b)$ in the same horizontal projection plane parallel to a plane where the microring optical resonators are arranged, where "a", "b" are the outside diameters of ring guides of the adjacent microring optical resonators.

2. The optical multiplexer/demultiplexer of claim 1, wherein the microring optical resonators are arranged in the layers higher and lower than the plane where the light guide main line is disposed.

3. The optical multiplexer/demultiplexer of claim 2, wherein the microring optical resonators are only arranged on a side of the light guide main line.

4. The optical multiplexer/demultiplexer of claim 3, wherein the microring optical resonators are arranged to overlap the light guide main line in the same horizontal projection plane parallel to a plane where the microring optical resonators are arranged.

5. The optical multiplexer/demultiplexer of claim 1, further comprising light guide branch lines optically coupled to the light guide main line via the microring optical resonators, respectively.

6. The optical multiplexer/demultiplexer of claim 5, wherein the light guide branch lines are arranged to respectively overlap the microring optical resonators in the same horizontal projection plane parallel to a plane where the microring optical resonators are arranged.

7. The optical multiplexer/demultiplexer of claim 5, wherein the light guide branch lines are arranged in a layer level with the plane where the light guide main line is disposed.

8. The optical multiplexer/demultiplexer of claim 5, wherein the light guide branch lines are arranged in the layers higher and lower than the microring optical resonators, respectively.

9. The optical multiplexer/demultiplexer of claim 5, wherein the light guide branch lines are arranged to perpendicularly intersect the microring optical resonators which are not directly optically coupled in the same horizontal projection plane parallel to a plane where the microring optical resonators are arranged.

10. The optical multiplexer/demultiplexer of claim 1, wherein the microring optical resonators are arranged on both sides of the light guide main line.

11. The optical multiplexer/demultiplexer of claim 1, wherein the light guide main line is formed by a straight portion, a curved portion, or a combination of a straight portion and a curved portion.

12. An optical multiplexer/demultiplexer comprising:
   a light guide main line which guides lights of a plurality of wavelengths; and
   a plurality of microring optical resonators directly optically coupled to the light guide main line,
   wherein the microring optical resonators are arranged on both sides of the light guide main line, and
   the plurality of microring optical resonators are partially overlapped in a plan view.

13. The optical multiplexer/demultiplexer of claim 12, wherein the microring optical resonators are alternately arranged in order of optical coupling on both sides of the light guide main line, respectively.

14. The optical multiplexer/demultiplexer of claim 12, wherein the microring optical resonators are first arranged in descending or ascending order of ring diameter on one side of the light guide main line, and the rest of the microring optical resonators are arranged in descending or ascending order of ring diameter on the other side of the light guide main line.

15. The optical multiplexer/demultiplexer of claim 12, further comprising a plurality of light guide branch lines optically coupled to the light guide main line via the microring optical resonators, respectively.

16. The optical multiplexer/demultiplexer of claim 15, wherein the light guide branch lines are arranged in a layer level with a plane where the light guide main line is disposed.

17. The optical multiplexer/demultiplexer of claim 12, wherein the microring optical resonators are arranged so that a distance "d" between points on a central line of the light guide main line which minimizes a distance between the light guide main line and the outer periphery of each of one and the other adjacent microring optical resonators satisfies $d \leq \sqrt{(ab)}$ in the same horizontal projection plane parallel to planes where the light guide main line and the microring optical resonators are arranged, where "a", "b" are the outside diameters of ring guides of the adjacent microring optical resonators.

18. The optical multiplexer/demultiplexer of claim 12, wherein the microring optical resonators are arranged in two of layers higher than, level with, and lower than a plane where the light guide main line is disposed.

19. The optical multiplexer/demultiplexer of claim 12, wherein the light guide main line is formed by a straight portion, a curved portion, or a combination of a straight portion and a curved portion.

20. An optical multiplexer/demultiplexer comprising:
   a light guide main line which guides lights of a plurality of wavelengths; and
   a plurality of microring optical resonators directly optically coupled to the light guide main line,
   wherein the plurality of microring optical resonators are arranged in two of layers higher than, level with, and lower than a plane where the light guide main line is disposed, and
   the plurality of microring optical resonators are partially overlapped in a plan view,
   wherein the microring optical resonators are arranged on both sides of the light guide main line.

21. The optical multiplexer/demultiplexer of claim 20, wherein the microring optical resonators are arranged in the layers higher and lower than the plane where the light guide main line is disposed.

22. The optical multiplexer/demultiplexer of claim 21, wherein the microring optical resonators are only arranged on a side of the light guide main line.

23. The optical multiplexer/demultiplexer of claim 22, wherein the microring optical resonators are arranged to overlap the light guide main line in the same horizontal projection plane parallel to a plane where the microring optical resonators are arranged.

24. The optical multiplexer/demultiplexer of claim 20, further comprising light guide branch lines optically coupled to the light guide main line via the microring optical resonators, respectively.

25. The optical multiplexer/demultiplexer of claim 20, wherein the light guide main line is formed by a straight portion, a curved portion, or a combination of a straight portion and a curved portion.

* * * * *